United States Patent [19]

Tozer

[11] Patent Number: 4,784,397
[45] Date of Patent: Nov. 15, 1988

[54] HOLLOW METALLIC SEALING RING

[75] Inventor: Michael J. C. Tozer, Craigmillar, Stocksfield, Northumberland, England

[73] Assignees: Michael J. C. Tozer, Northumberland, England; Specialist Sealing Limited, Channel Islands, Channel Islands

[21] Appl. No.: 121,196

[22] Filed: Nov. 16, 1987

Related U.S. Application Data

[63] Continuation-in-part of Ser. No. 45,435, May 4, 1987, abandoned.

[30] Foreign Application Priority Data

May 2, 1986 [GB] United Kingdom ............... 8610771

[51] Int. Cl.⁴ .................... F16J 15/08; F16J 15/28
[52] U.S. Cl. ................................ 277/236; 277/200; 277/206 R

[58] Field of Search ............. 277/200, 205, 206 R, 277/212 R, 212 C, 236

[56] References Cited

U.S. PATENT DOCUMENTS

| | | | |
|---|---|---|---|
| 2,474,493 | 6/1949 | Phillips | 277/200 X |
| 3,192,690 | 7/1965 | Taylor | 277/236 X |
| 3,204,971 | 9/1965 | Meriano | 277/206 R X |
| 3,595,588 | 7/1971 | Rode | 277/236 X |
| 3,797,836 | 3/1974 | Halling | 277/200 X |
| 4,121,843 | 10/1978 | Halling | 277/200 |

Primary Examiner—Robert S. Ward
Attorney, Agent, or Firm—Fidelman & Wolffe

[57] ABSTRACT

A hollow metallic sealing ring comprised in radial cross-section of pair of outwardly convex limbs contiguous with a loop formation having at least one straight sided loop, the limbs, from their junctions with the ends of the loop formation being of increasing radius towards their free ends which are straight and substantially parallel.

8 Claims, 5 Drawing Sheets

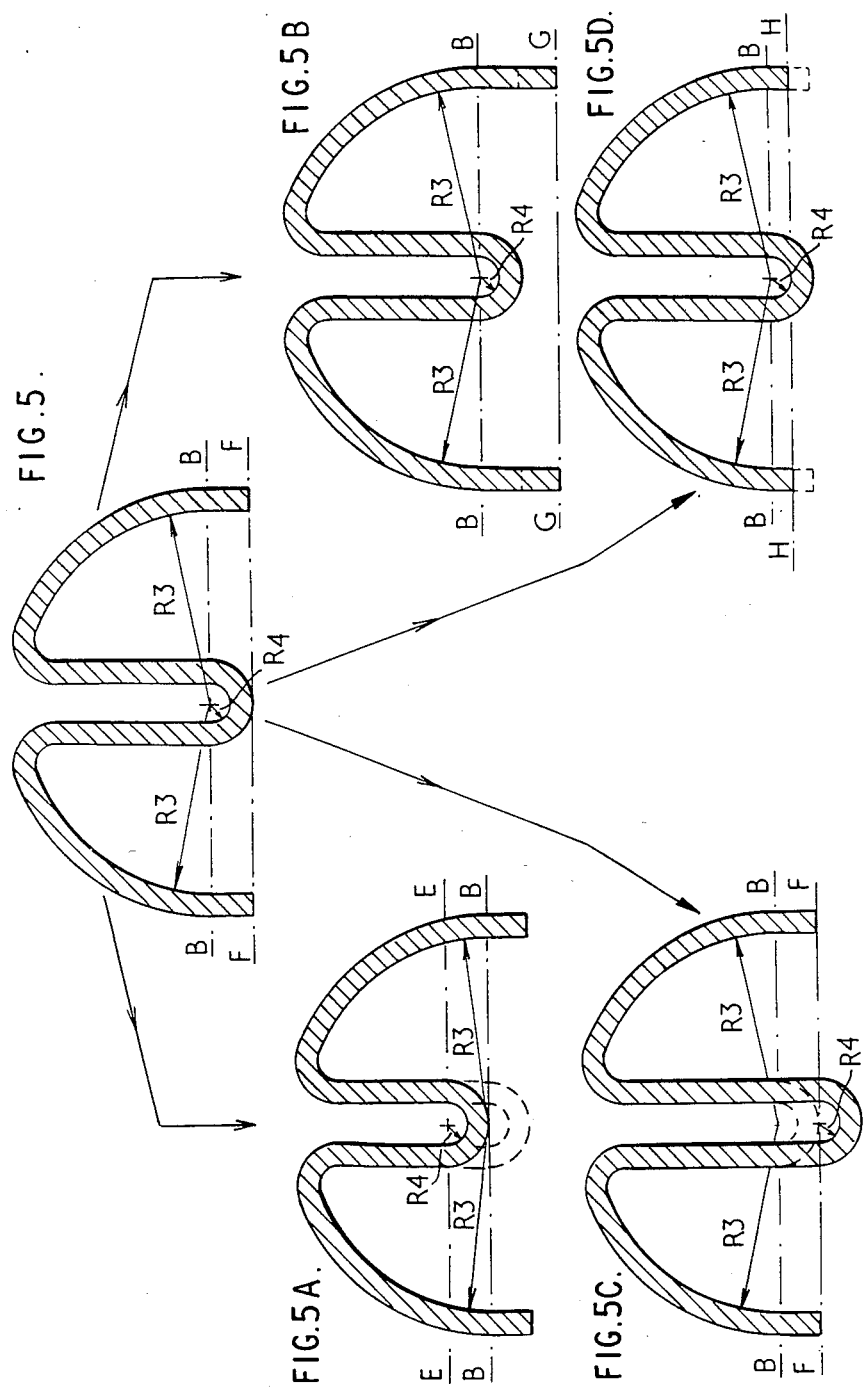

HOLLOW METALLIC SEALING RING

CROSS-REFERENCE TO RELATED APPLICATIONS

This application is a continuation-in-part of application Ser. No. 045,435, filed May 4, 1987, now abandoned.

BACKGROUND OF THE INVENTION

This invention relates to hollow metallic sealing rings of the so-called low-load self-energizing static kind as used for instance in pumps, motors and other apparatus to form leakproof seals between opposed, usually plane, parallel surfaces.

Conventional metallic sealing rings for this purpose are of 'C' or 'O' shaped radial cross-section but these have a major disadvantage in that they have a high spring rate and for many applications when the seal must have a large diameter the resultant compressive loads required are extremely high and not suited to the relatively weak flanges such as are used, for example, on aero engines.

Difficulties also arise when the gap to be sealed between surfaces or flanges is relatively large as happens with certain engines because of the need to cater for the manufacturing tolerances in assembly of the various parts of the engine which determine the relative position of the flanges. Further, this accumulated tolerance is compounded by differential expansion of the flanges both longitudinally and radially. There is therefore constant movement as the engine temperature varies from cold to hot and sealing contact points are not of constant diameter. The sealing ring must accordingly be sufficiently resilient to cope with large amounts of radial and axial expansion and contraction.

To this end, various forms of sealing ring which, in radial section, are of concertina or bellows-shaped profile have been proposed and comprise two outer limbs, intended to engage the surfaces or flanges to be seated connected by one or more contiguous loops. Typical examples of such metallic sealing rings are those which are disclosed in U.S. Pat. Nos. 3,575,432, 3,797,836 and 4,121,843. In each of those examples the outer limbs are of sinuous configuration with curved extremities which make line contact with the surfaces or flanges to be sealed.

SUMMARY OF THE INVENTION

The present invention has been devised with the object of providing a sealing ring which has a superior performance compared with the sealing rings which have been hitherto proposed and/or used.

In accordance with the present invention a hollow metallic sealing ring is comprised in radial cross-section of a pair of outwardly convex limbs which extend from the ends of a loop formation having at least one contiguous straight sided loop, the limbs, from their junctions with the ends of the loop formation, being of increasing radius towards their free ends which are straight and substantially parallel.

Preferably the radius of the curved end of the loop is considerably less than the minimum radius of the aforesaid outwardly convex limbs. Also where there is more than one loop, individual loops may be of different width.

BRIEF DESCRIPTION OF DRAWINGS

Some particular and at present preferred embodiments of the invention are illustrated in the accompanying drawings, in which:

FIGS. 5, 5A, 5B, 5C and 5D similarly illustrate changes in the loop length and straight limb part length of a sealing ring.

DESCRIPTION OF THE PREFERRED EMBODIMENTS

Figure 1:
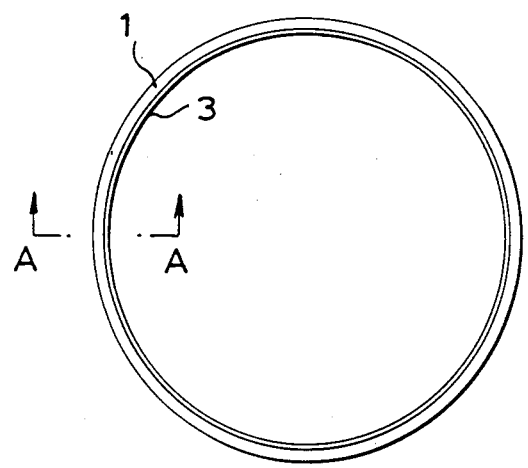
FIG. 1 is a plan view of a single loop sealing ring.
Figure 2:
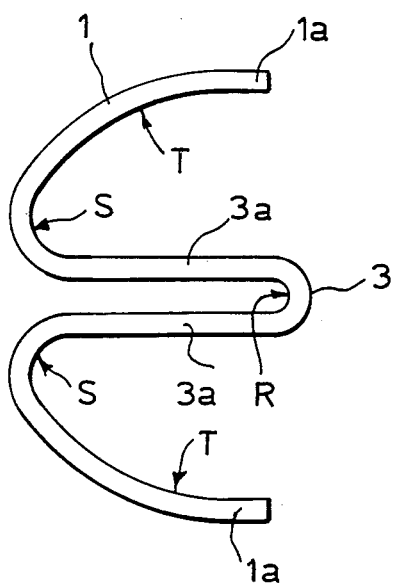
FIG. 2 is an enlarged scale radial cross-section on line A-A of FIG. 1.

Referring firstly to FIGS. 1 and 2 of the drawings, the hollow metallic sealing ring therein shown is intended for a turbine gas path aircraft engine and is made of a metal alloy known as NIMONIC 80A Specification BS 2HR 201 of thickness 0.008±0.001 inches which is formed as a circular arc with its two ends subsequently welded together. The ring in heat treated firstly for 1 hour at 925° C.±10° C. in a vacuum, then force cooled, and finally heat treated for 4 hours at 750° C.±10° in vacuum.

As shown in FIG. 2 the ring in radial cross-section is of somewhat W-shape with two outwardly convex limbs 1 connected to a central loop 3 of which the sides 3a are parallel and relatively close together. The radius R of the central part of the loop is significantly less than the transition radius S between the side 3a and the limbs 1, whilst the free ends 1a of the limbs 1 which engage the surfaces or flanges to be sealed are straight, substantially parallel, and lightly lapped and polished.

Typically the outside diameter of the ring is 10.478 inches, the axial length is 0.248 inches, the inside radius S is 0.023 inches and the inside radius R is 0.009 inches. The length of the straight free ends 1a is 0.020 inches, the inside diameter at the free ends is 10.2 inches, the inside diameter at the loop 3 is 10.150 inches and the distance between the centers of radius S is 0.088 inches. The nominal radius T is 0.126 inches.

Figure 3:
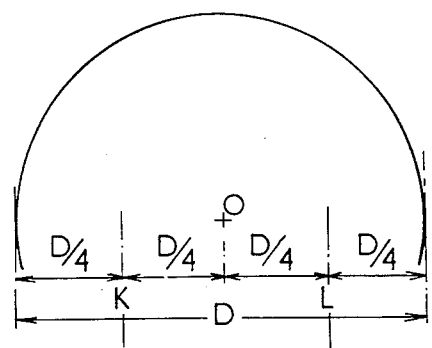
FIGS. 3, 3A, 3B and 3C are diagrammatic views to illustrate four stages in the formation of a particular sealing ring.
Figure 3A:
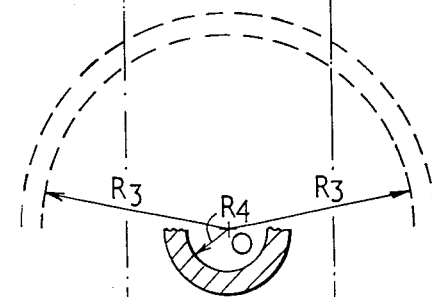
Figure 3B:
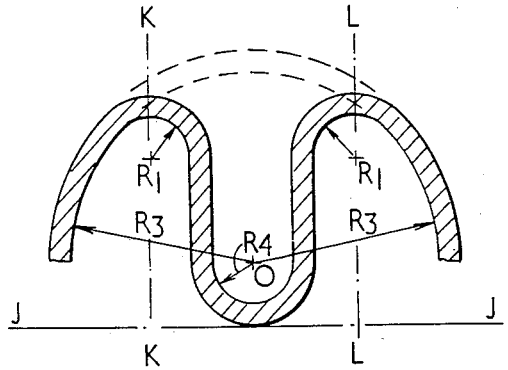
Figure 3C:
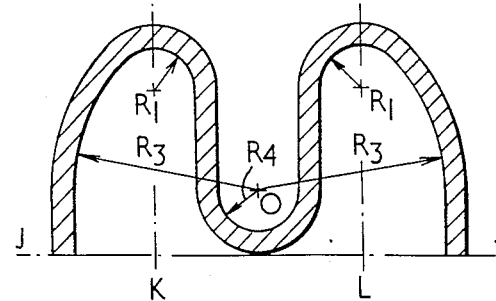

In the stages of ring formation illustrated in FIGS. 3 to 3C inclusive, D is equivalent to the width of the space to be filled by a sealing ring which is this instance is made of metal such as steel, stainless steel, or an alloy with a high nickel content using appropriate heat treatments. The thickness T of the metal may in this instance by 0.3 mm (0.012 inches). FIG. 3A shows the width D notionally divided into four equal parts D/4 defining centers of radius lines O, K and L. FIG. 3A shows respective radii R3 and R4 where:

$R3 = D/2 - T$ and $R4 = D/8 - T/2$

FIG. 3B shows an added radius R1 where:

$R1 = R4 = = D/8 - T/2$

In FIG. 3C, J is a line drawn tangential to the center of the central loop perpendicular to lines O, K and L and 3D shows the addition of straight sections to the limbs as far as this line J.

Due to large variations in the size and shape of the recesses which are to be occupied by these rings, it is necessary on occasions to vary the relative dimensions of their constituent parts.

Figure 4:
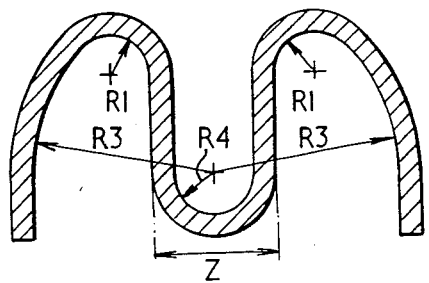
FIGS. 4, 4A, 4B and 4C similarly illustrate stages in the formation of a sealing ring with alternative limb and central loop radii.
Figure 4A:
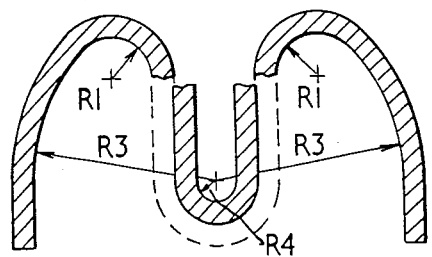
Figure 4B:
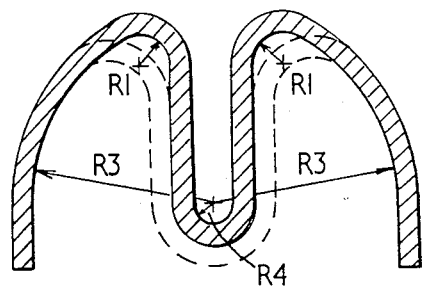
Figure 4C:
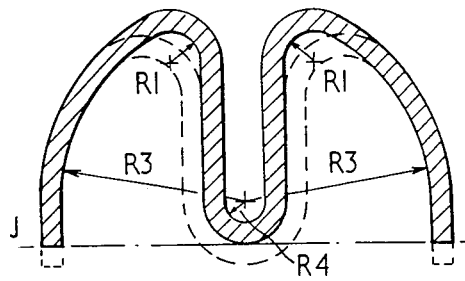

Stages in variation of the limb and loop radii are for example shown in FIGS. 4 to 4C.

Firstly radius R4 is reduced in order to reduce the loop width Z. Then the radius R1 is reduced and the center is positioned so that the part formed by radius R1 joins the reduced width loop and also still joins the part formed by radius R3. Finally, the straight part of the limb is reduced to the line J.

The mode of achieving variations in loop and straight limb part is shown in FIGS. 5 to 5D.

Firstly, the center for radius R4 is moved from line B to line E (FIG. 5A), a distance which is equal to twice the metal thickness, i.e., 2T. Also the straight part of each limb can be extended from line F (FIG. 5) to line G (FIG. 5B) that is to say by an amount of 2T.

The transition from FIG. 5 to FIG. 5C shows how the center for radius R4 can be moved from line B to line F where the distance between lines B and F is 2T.

Finally, the transition from FIG. 5 to FIG. 5D shows how the length of the flat part of the links can be reduced from line F to line H a decrease of T (the material thickness).

It is to be understood that any of the changes depicted between FIGS. 3 to 5 inclusive can be made independently of the others or a combination of such changes can be made.

Figure 6:
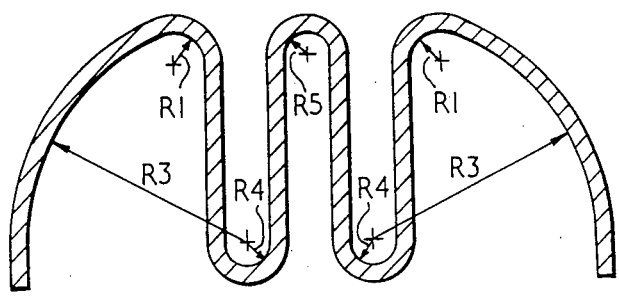
FIGS. 6, 7, 8 and 9 are cross-sections of four different plural loop embodiments of the invention.

FIG. 6 shows a plural loop version of the sealing ring illustrated in FIG. 5 by the addition of an extra convolution to provide two loops of equal width with two radii R1, two radii R3, two radii R4 and one radius R5, the distance between the two loops being the same as the internal width of each loop. The loops have the same length as the outer limbs.

Figure 7:
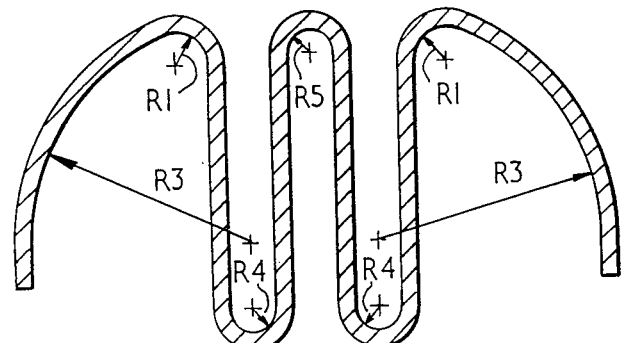

FIG. 7 shows a plural loop sealing ring similar to that which is shown in FIG. 7 except that, as a result of a change in the position of radius R4, the loops are elongated beyond the outer limbs.

Figure 8:
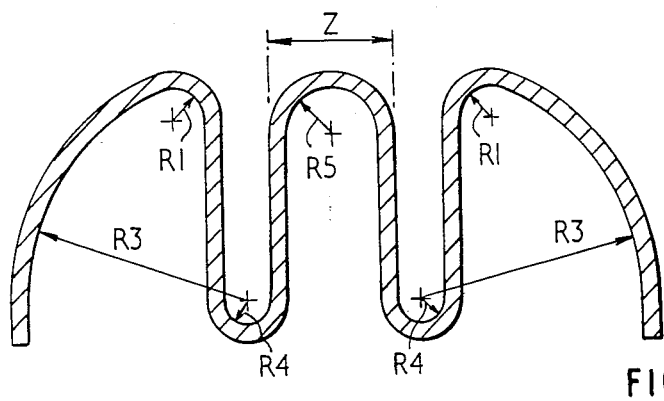

FIG. 8 shows a variation of the sealing ring shown in FIG. 6 wherein by an increase in radius R5 there is an increased bridging dimension Z between the loops which in this embodiment also are the same length as the outer limbs.

Figure 9:
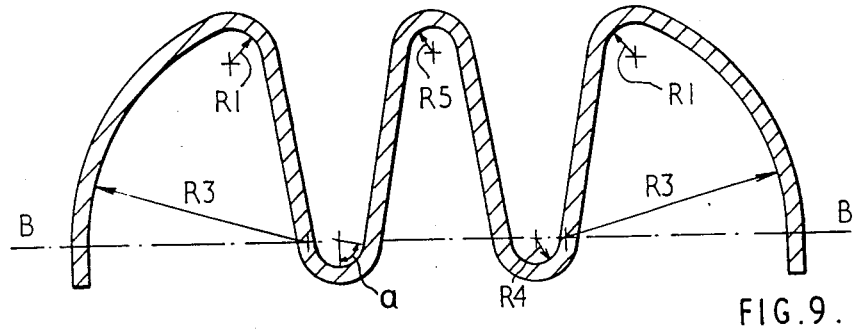

Finally, FIG. 9 shows a two loop sealing ring wherein, as a result of the movement of the centers of radii, R1, R4 and R5 the loops or convolutions have non-parallel sides.

While the invention has been particularly shown and described in reference to preferred embodiments thereof, it will be understood by those skilled in the art that changes in form and details may be made therein without departing from the spirit and scope of the invention.

I claim:

1. A hollow metallic sealing ring comprised in radial cross-section of a pair of outwardly convex limbs which are contiguous with a loop formation having at least one straight sided loop, the limbs, from their junctions with the ends of the loop formation, being of increasing radius towards their free ends which are straight and substantially parallel.

2. A hollow metallic sealing ring as claimed in claim 1, wherein the radius of the curved end of the loop is less than the minimum radius of the said outwardly convex limbs.

3. A hollow metallic sealing ring as claimed in claim 1, herein the length of at least one loop is co-extensive with the length of the limbs.

4. A hollow metallic sealing ring as claimed in claim 1, wherein the length of at least one loop is greater than the length of the limbs.

5. A hollow metallic sealing ring as claimed in any of claims 1-4, wherein the distance between adjacent loops is substantially the same as the inside width of those loops.

6. A hollow metallic sealing ring as claimed in claim 1, wherein the distance between adjacent loops exceeds the inside width of those loops.

7. A hollow metallic sealing ring as claimed in claim 1, wherein at least one loop has parallel sides.

8. A hollow metallic sealing ring as claimed in claim 1, wherein at least one loop has divergent sides.

* * * * *